(12) United States Patent
Stupar et al.

(10) Patent No.: US 11,242,883 B2
(45) Date of Patent: Feb. 8, 2022

(54) FASTENER SEALING MATERIAL AND METHOD

(71) Applicant: Nylok LLC, Macomb, MI (US)

(72) Inventors: Jeffrey M. Stupar, West Dundee, IL (US); Pakkatorn Jaroenwatthanawinyoo, Chicago, IL (US)

(73) Assignee: Nylok LLC, Macomb, MI (US)

( * ) Notice: Subject to any disclaimer, the term of this patent is extended or adjusted under 35 U.S.C. 154(b) by 617 days.

(21) Appl. No.: 16/166,654

(22) Filed: Oct. 22, 2018

(65) Prior Publication Data

US 2019/0120280 A1   Apr. 25, 2019

Related U.S. Application Data

(63) Continuation-in-part of application No. 15/844,985, filed on Dec. 18, 2017, now abandoned.

(Continued)

(51) Int. Cl.
| | |
|---|---|
| *F16B 39/00* | (2006.01) |
| *F16B 39/22* | (2006.01) |
| *B05D 3/06* | (2006.01) |
| *B05D 3/14* | (2006.01) |
| *F16B 19/00* | (2006.01) |

(Continued)

(52) U.S. Cl.
CPC ............ *F16B 39/225* (2013.01); *B05D 3/067* (2013.01); *B05D 3/142* (2013.01); *C09J 4/00* (2013.01); *C09J 175/16* (2013.01); *F16B 19/008* (2013.01); *F16B 33/004* (2013.01); *B05D 2202/10* (2013.01); *B05D 2258/00* (2013.01); *C08G 2190/00* (2013.01); *C08L 33/08* (2013.01); *C09J 4/06* (2013.01); *C09J 133/08* (2013.01); *C09J 2433/00* (2013.01)

(58) Field of Classification Search
USPC .......................................................... 411/258
See application file for complete search history.

(56) References Cited

U.S. PATENT DOCUMENTS

| 5,030,665 A | 7/1991 | Lee |
|---|---|---|
| 5,853,520 A | 12/1998 | Rich |
| (Continued) | | |

FOREIGN PATENT DOCUMENTS

| CN | 102295890 A | 12/2011 |
|---|---|---|
| CN | 103666357 A | 3/2014 |
| (Continued) | | |

OTHER PUBLICATIONS

International Preliminary Report on Patentability and Written Opinion issued by International Bureau in connection with PCT/US2017/067531 dated Jul. 4, 2019.

(Continued)

*Primary Examiner* — Gary W Estremsky
(74) *Attorney, Agent, or Firm* — Levenfeld Pearlstein, LLC

(57) ABSTRACT

A fastener sealing material for application to fasteners is formulated from an acrylate present in a concentration of about 90 to about 97 percent by weight of the sealing material and a nanostructured material present in a concentration of about 3 to about 10 percent by weight of the sealing material. The sealant is applied to the fastener as a liquid and is cured using an ultraviolet or LED light source and without the use of heat.

16 Claims, 12 Drawing Sheets

Related U.S. Application Data

(60) Provisional application No. 62/437,967, filed on Dec. 22, 2016.

(51) Int. Cl.

| | |
|---|---|
| *F16B 33/00* | (2006.01) |
| *C09J 175/16* | (2006.01) |
| *C09J 4/00* | (2006.01) |
| *C08L 33/08* | (2006.01) |
| *C09J 4/06* | (2006.01) |
| *C09J 133/08* | (2006.01) |

(56) References Cited

U.S. PATENT DOCUMENTS

| | | | | |
|---|---|---|---|---|
| 5,959,002 | A * | 9/1999 | Kuramochi | C08F 291/00 |
| | | | | 523/176 |
| 6,384,104 | B1 * | 5/2002 | Chang | A61K 8/0279 |
| | | | | 424/59 |
| 7,160,630 | B2 * | 1/2007 | Klos | C25D 5/48 |
| | | | | 411/378 |
| 7,547,735 | B1 * | 6/2009 | Konarski | C08L 15/00 |
| | | | | 106/287.23 |
| 7,842,403 | B2 * | 11/2010 | Meyer, Jr. | C23C 22/53 |
| | | | | 428/686 |
| 8,092,128 | B1 * | 1/2012 | Bray | F16B 19/008 |
| | | | | 411/82.3 |
| 8,353,651 | B2 * | 1/2013 | Levandoski | F16B 39/021 |
| | | | | 411/258 |
| 9,231,138 | B2 * | 1/2016 | Kawamura | H01L 51/0096 |
| 2007/0202403 | A1 * | 8/2007 | Oh | H01M 4/587 |
| | | | | 429/217 |
| 2009/0255594 | A1 | 10/2009 | Haller | |
| 2011/0287382 | A1 | 11/2011 | Johnson | |
| 2012/0168055 | A1 * | 7/2012 | Bray | F16B 1/0071 |
| | | | | 156/64 |
| 2013/0309040 | A1 | 11/2013 | Phillips | |
| 2014/0004273 | A1 | 1/2014 | Wu | |
| 2014/0329927 | A1 | 11/2014 | Ha | |
| 2016/0215136 | A1 * | 7/2016 | Jancar | C08K 9/06 |
| 2017/0137601 | A1 * | 5/2017 | Heikkinen | C08K 3/34 |
| 2019/0352542 | A1 * | 11/2019 | Schwartz | C09J 5/06 |

FOREIGN PATENT DOCUMENTS

| | | |
|---|---|---|
| EP | 0458471 A2 | 11/1991 |
| KR | 20110102753 A | 9/2011 |
| TW | 449648 B | 8/2001 |
| TW | 200643041 A | 12/2006 |
| TW | 200722448 A | 6/2007 |
| TW | 201418432 A | 5/2014 |
| WO | 0057070 A1 | 9/2000 |

OTHER PUBLICATIONS

China Search Report issued by The National Intellectual Property Administration, PRC in connection with Chinese Patent Application No. 2017800794262 dated Jan. 12, 2021.

International Preliminary Report on Patentability issued by ISA/EPO in connection with PCT/US2019/057310 dated Apr. 27, 2021.

International Search Report and Written Opinion issued by ISA/EPO in connection with PCT/US2019/057310 dated Feb. 13, 2020.

Dodiuk H et al., Nanotailoring of epoxy adhesives by polyhedral-oligomeric-sil-sesquioxanes (POSS), International Journal of Adhesion and Adhesives, Sep. 30, 2004, pp. 211-218, vol. 25, No. 3, Elsevier, Amsterdam, NL.

* cited by examiner

Before Application

After Application

Before Application

After Application

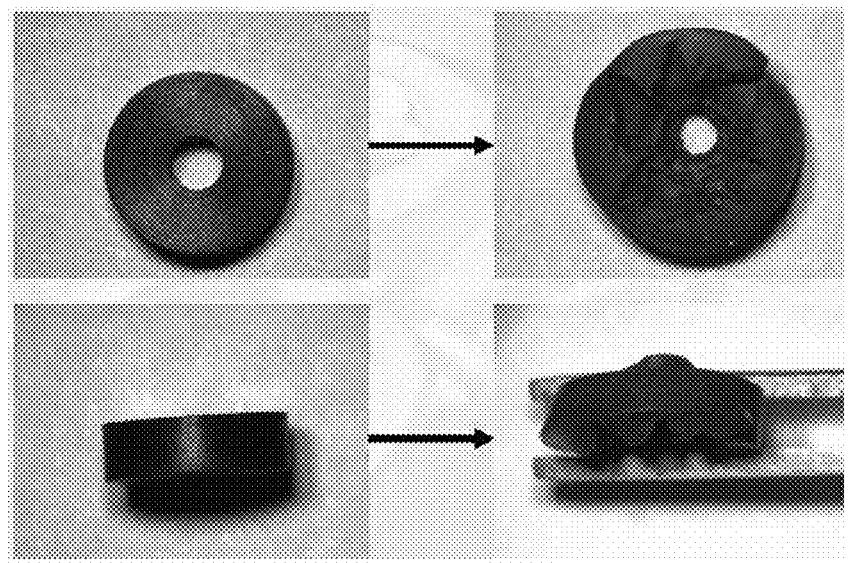
FIG. 9D
(Prior art)
FIG. 9E
(Prior art)
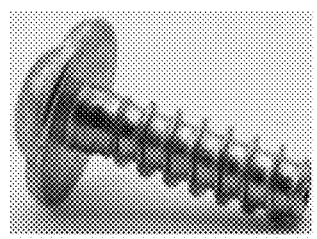
FIG. 10A
FIG. 10B
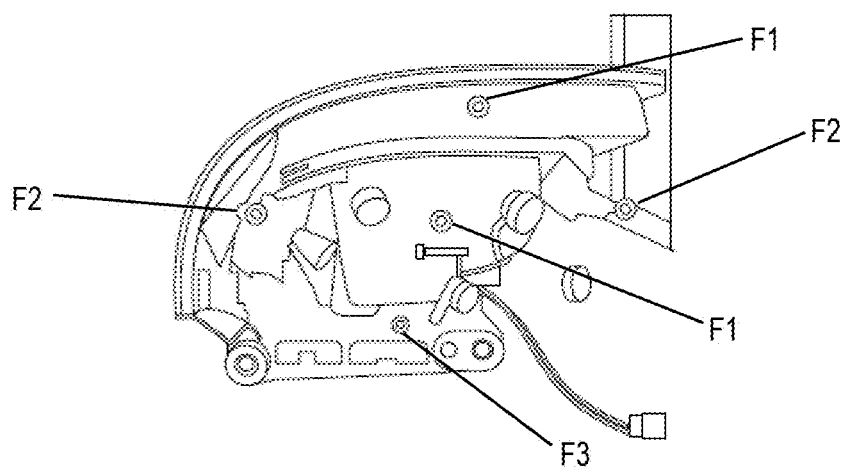
FIG. 11

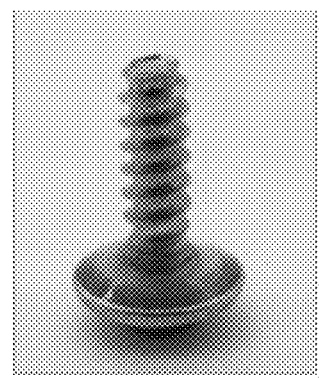
Fig. 15
Fig. 16
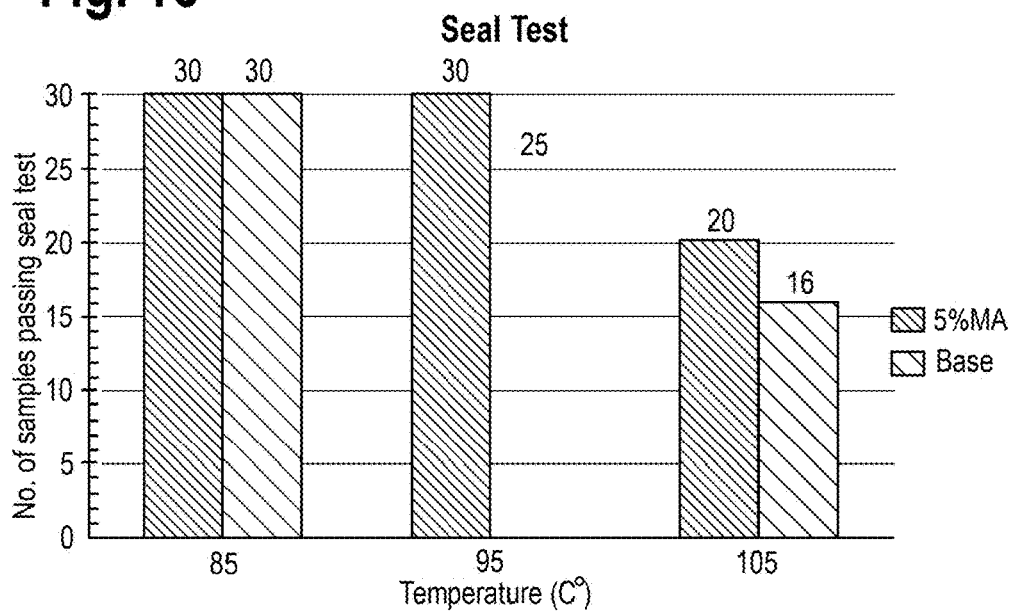
Fig. 17
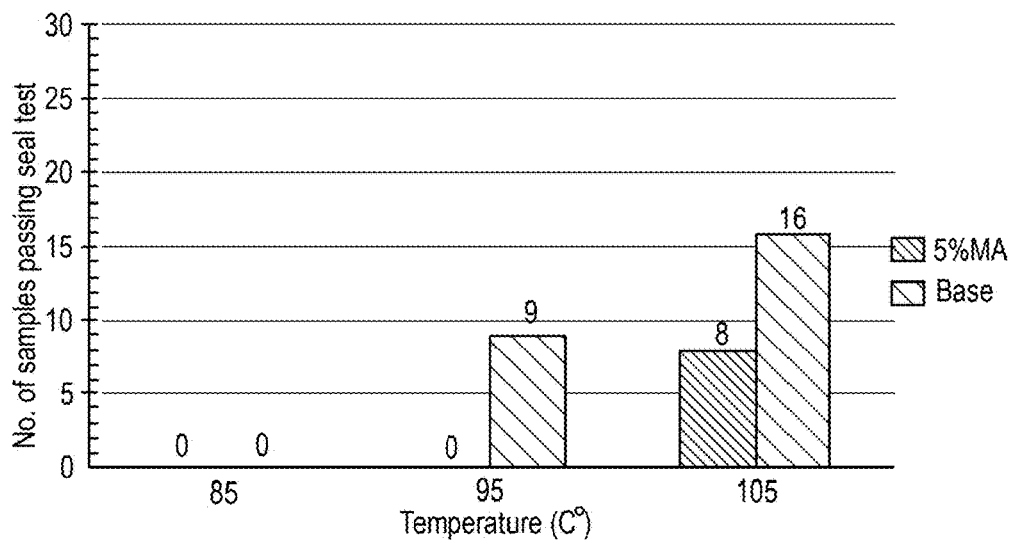

FASTENER SEALING MATERIAL AND METHOD

CROSS-REFERENCE TO RELATED APPLICATION DATA

This application is a continuation-in-part of U.S. patent application Ser. No. 15/844,985, filed Dec. 18, 2017, entitled "Fastener Sealing Material and Method", which claims the benefit of and priority to Provisional U.S. Patent Application Ser. No. 62/437,967, filed Dec. 22, 2016, entitled "Fastener Sealing Material and Method", the disclosures of which are incorporated herein in their entirety.

BACKGROUND

The present disclosure relates to a material for sealing fasteners in place to, for example, prevent the ingress of water, moisture and dust, into an assembly in which the fastener is used, and a method for applying such a sealing material.

Fasteners are used, for example, to secure components to one another. In one example, fasteners are used to secure components within electronic devices, such as smart phones, tablets, pads and the like. As the devices get smaller, so too are the components and the fasteners to secure the components getting smaller. And, although devices are getting smaller, the need to maintain the components free from water, moisture and dust has not changed. In fact, many such smaller devices require an even higher level of assurance that components are well isolated from the environs in order to properly function.

While there are known sealing materials, these materials are provided in powdered form, such as nylon 11 powder, and require that the fasteners are heated, before or after application of the material, in order for the material to melt and flow around the underside of the head of the fastener. These materials and methods of applying a sealing material work well for larger fasteners. However, for miniature and sub-miniature fasteners—fasteners having head diameters of 2.0 mm (M2.0) to 3.0 mm (M3.0) and 0.8 mm (M0.8) to 1.4 mm (M1.4), respectively, which fasteners have shank diameters of about ½ the head diameter, these materials and methods can pose problems, and the rejection rate can be as high as 10-20 percent due to overspray issues. This rejection rate is significantly higher than what is acceptable, especially in that the fasteners can only be reworked one time, e.g., the material can only be removed and the sealing material reapplied only one time.

In other applications, such as those that use larger fasteners, the powder application of sealant to fasteners works well, but has drawbacks. For example, in some applications the sealants may be subjected to elevated temperatures and may not meet certain requirements when subject to these elevated temperatures. In the automotive industry, fastener sealants may be required to meet certain specifications including maintaining a sealed environment of at least 85° C. (185° F.), maintain high adhesion to the fastener, exhibit minimal compression set, maintain the ability to withstand repeated installations and removals (tightening and loosening), maintain physical integrity (e.g., no cracking), all while maintaining a desired physical appearance.

Known sealants, such as those illustrated in FIGS. 9A-9E, include polymeric coatings and preformed resilient washers, such as silicone and the like. Often, such preformed washers cannot withstand the temperature requirements while maintaining physical integrity, repeated installations and removals, and minimal or no compression set.

Accordingly, there is a need for a material that can be used to seal fasteners in an assembly and provide an acceptable seal against environmental conditions such as water, moisture, dust and the like. Desirably, such a material is applied to the fasteners in liquid form and can readily flow around the underside of the fastener head (the bearing surface), as desired, to provide a complete covering of the underside of the head, without overspray. More desirably still, such a material rapidly cures and a method of application is a non-heat or minimally heat-applying and producing process. Still more desirably, such a material permits reuse of the fasteners—that is the fastener can be applied and removed and reapplied with the sealing material maintaining its sealing properties.

SUMMARY

Various embodiments of the present disclosure provide a fastener sealing material for application to miniature and sub-miniature fasteners. The sealing material is formulated from a liquid applied acrylate material, such as an acrylated urethane, and acrylated polyester and the like. The liquid applied material is cured using an ultraviolet or LED light source and without the use of heat.

In an embodiment, a viscosity of the material is less than about 1500 centipoise. The viscosity of the material can be about 500-2000 centipoise. Such a viscosity allows the sealant to, if desired, somewhat wick up onto the shank of the fastener. This geometry may be required in certain applications. In other applications wicking is not required or desired.

A super hydrophobic material can be included as an additive. Other additives include a suitable photoinitiator, and can include a pigment present in an amount so as to not impede curing the material, a flow modifier and a heat resistive additive material.

In an embodiment, the material cures on the fastener in no more than about 2-20 seconds, preferably about 2-10 seconds and more preferably about 2-5 seconds when subject to ultraviolet or LED light and at a temperature of no more than about 66 deg. C. (about 151 deg. F.), and preferably at about room temperature 25 deg. C. (about 77 deg. F.). Fasteners with the sealing material thereon retain their sealing characteristics following multiple installations and removals. For example, fasteners with the sealing material thereon retain their sealing characteristics following at least three installations and removals.

In some embodiments, when applied to a fastener, the fastener sealing material wicks on to a portion of a shank of the fastener. In other embodiments, the sealing material does not wick up on a portion of the fastener shank. The fastener sealing material may also, when applied to a fastener, form a locking material for the fastener. A method of making a fastener with a sealing material thereon is also desired.

Other aspects, objectives and advantages will become more apparent from the following detailed description when taken in conjunction with the accompanying drawings.

BRIEF DESCRIPTION OF THE DRAWINGS

FIGS. 7A and 7B are photographs showing the ability of the material to wick up onto the shank of a fastener in which FIG. 7A illustrates a fastener prior to application of the present sealing material and FIG. 7B illustrates a fastener in which the sealing material is applied to the fastener and shows the material wicking onto a portion of the shank of the fastener;

FIGS. 9A-9E are illustrations of prior art sealant elements before and after use;

FIGS. 10A and 10B illustrate fasteners before (FIG. 10A) and after (FIG. 10B) application of a present sealant;

FIG. 11 illustrates an example of a taillight assembly;

FIG. 15 shows the underside of the fastener head after 5 installations and removals of the fastener and shows no degradation (e.g., no cracking or delamination) of the sealant;

FIG. 16 is a graphical representation of the results of seal tests that were conducted on a control groups of fasteners and a group of fasteners with a present sealant at various temperatures;

FIG. 17 is a graphical representation of the results of cracking tests that were conducted on a control groups of fasteners and a group of fasteners with a present sealant at various temperatures

Figure 1A:
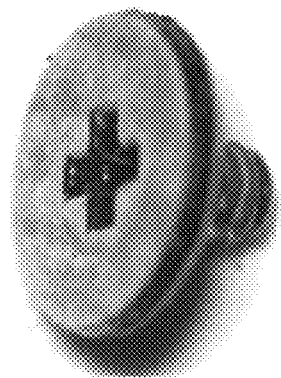
FIGS. 1A-1H are photographs of fasteners having a known, prior art sealing material applied thereto.
Figure 1B:
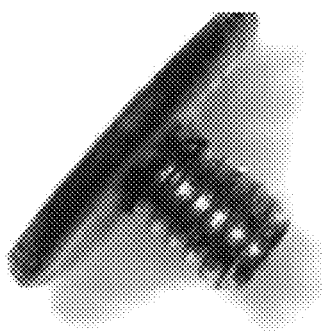
Figure 1C:
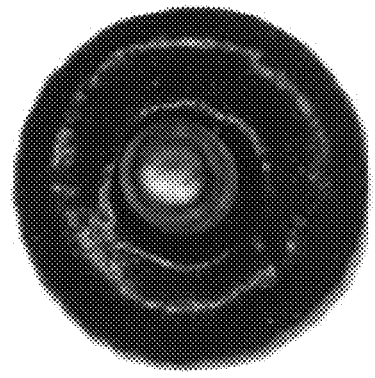
Figure 1D:
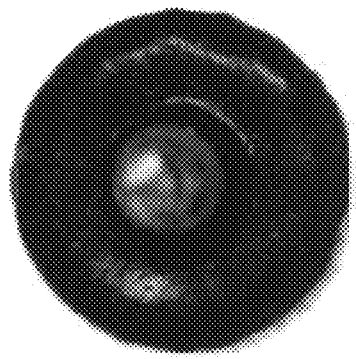
Figure 1E:
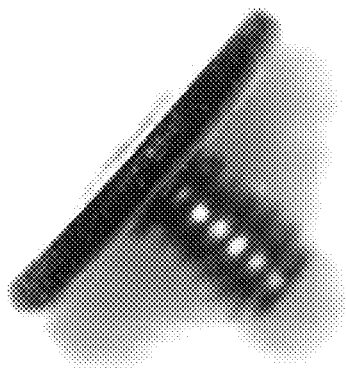
Figure 1F:
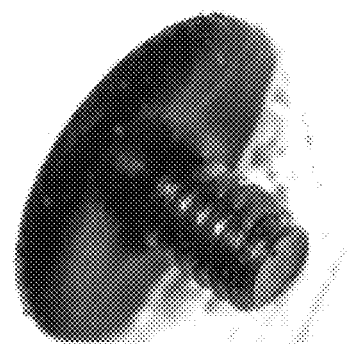
Figure 1G:
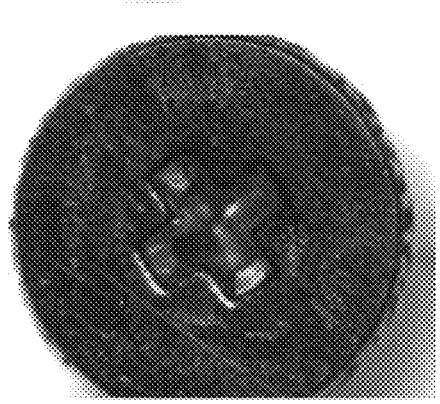
Figure 1H:
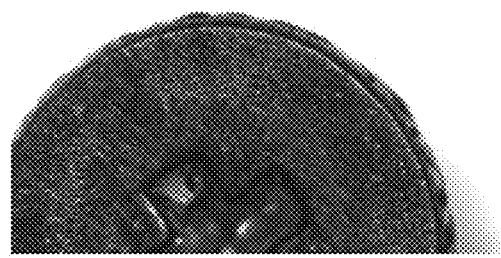
Figure 2:
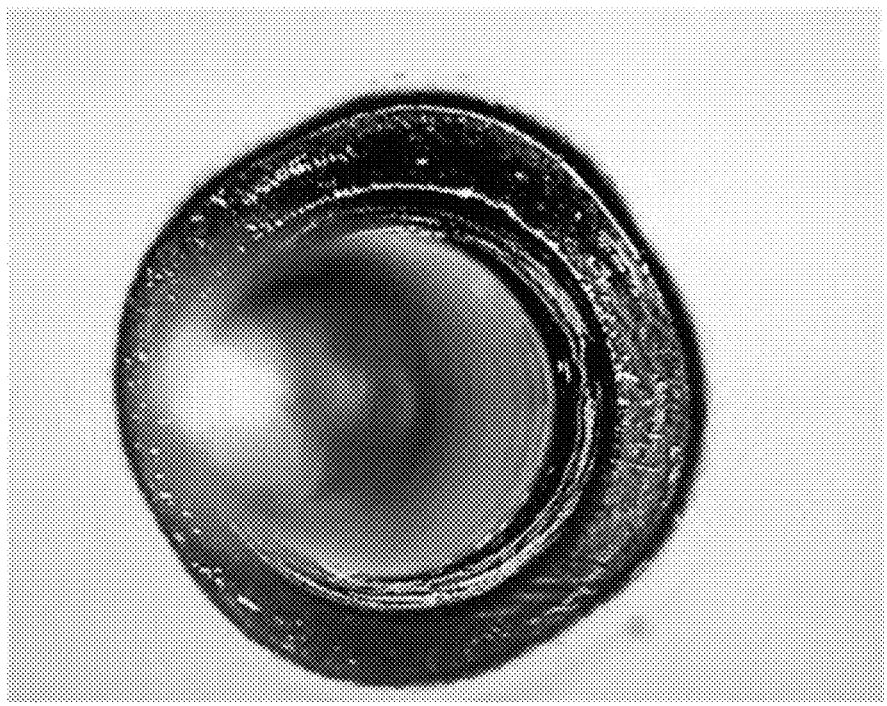
FIG. 2 is a photograph of an M1.4 fastener bearing surface having an embodiment of the present fastener sealing material applied thereto, illustrating the flow coating of the underside of the fastener head.
Figure 3A:
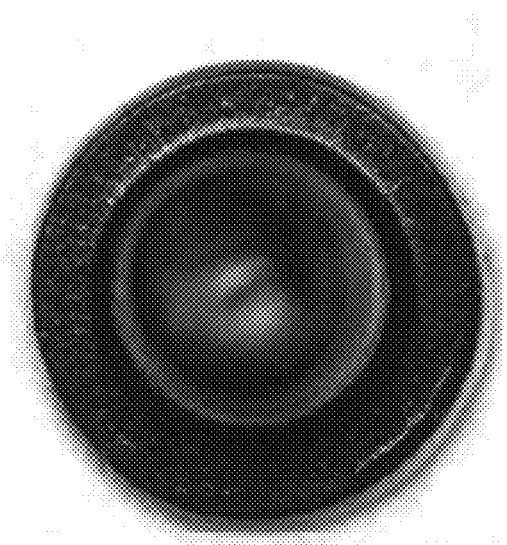
FIGS. 3A and 3B are photographs of the underside or under head (bearing) surface of an M1.4 fastener prior to application of the present fastener sealing material (FIG. 3A) and after application of the fastener sealing material (FIG. 3B)
Figure 3B:
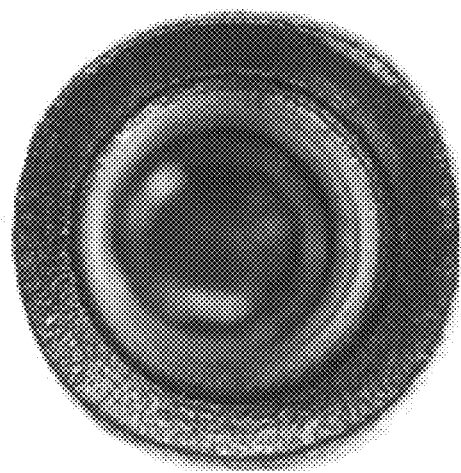
Figure 4A:
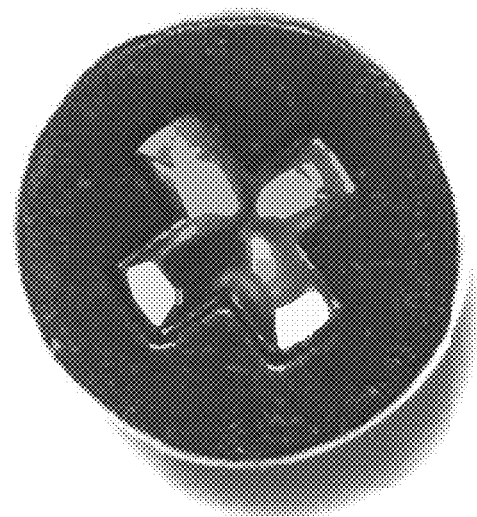
FIGS. 4A-4B are photographs of the top side of an M1.0 fastener before and after application of the present sealing material.
Figure 4B:
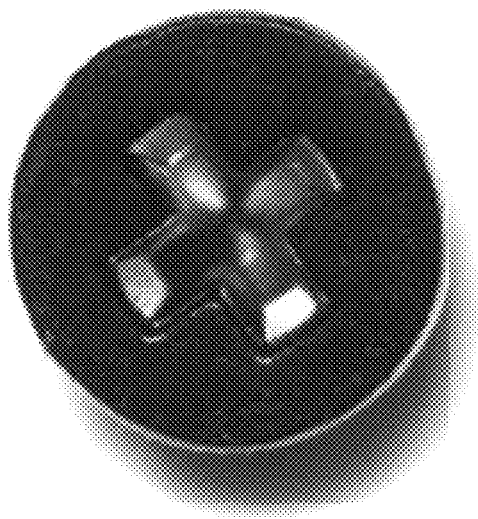
Figure 4C:
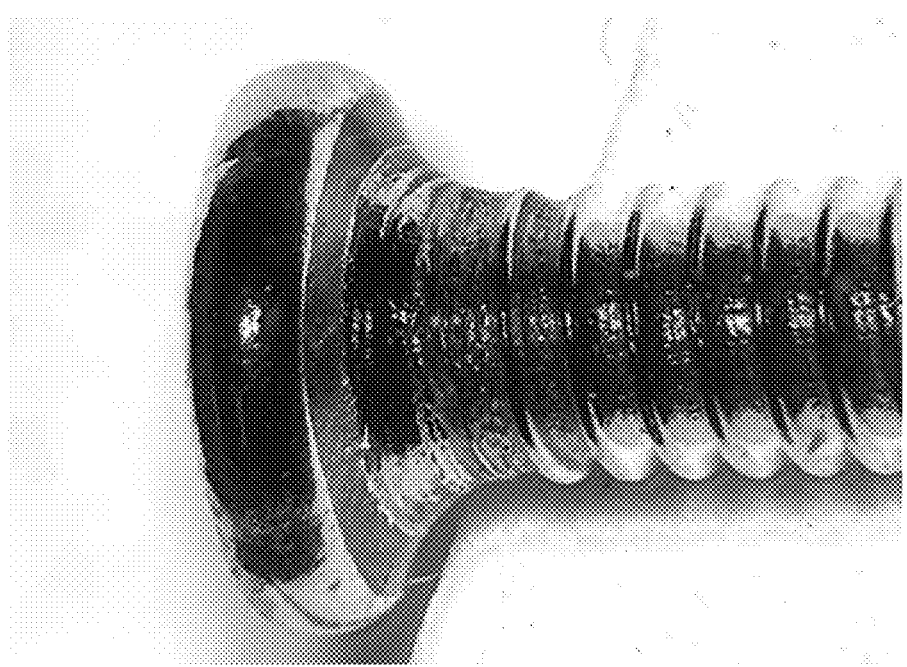
FIG. 4C is a photograph of the underside of the head and a portion of the shank of a 4-40 sized fastener following application of the present fastener sealing material.

These and other features and advantages of the present disclosure will be apparent from the following detailed description, in conjunction with the appended claims.

DETAILED DESCRIPTION

While the present disclosure is susceptible of embodiments in various forms, there is described presently preferred embodiments with the understanding that the present disclosure is to be considered an exemplification and is not intended to limit the disclosure to the specific embodiments illustrated.

In one aspect, the need to provide a seal between fasteners and components that are being fastened is paramount and is of particular importance in today's electronic devices. This need is exaggerated by the constant reduction in size of the components within these devices. Known materials are not adequate for sub-miniature fasteners which are fasteners having head diameters of 0.8 mm (M0.8) to 1.4 mm (M1.4) and shank diameters of about ½ the head diameter, nor may the materials be adequate for miniature fasteners, which are those fasteners that have head diameters of about 2.0 mm (M2.0) to 3.0 mm (M3.0). And, it is anticipated that subminiature fasteners may in the future become even smaller.

Accordingly, an embodiment of a present sealing material includes as a principal material, an acrylate such as acrylated materials, for example, acrylated polyesters, aliphatic and aromatic acrylated urethanes and the like, such as an acrylated urethane, for example, that which is available from Dymax Corporation under product names MULTI-CURE®6-621 and 6-630, and that which is available from Advanced Adhesive Systems, Inc. of Newington, Conn. under product numbers AAS 81082A and 81091B. A super hydrophobic material additive may be added to the acrylate material, such as to an acrylated urethane to further resistance to water and moisture.

In one embodiment it was found that a formulation of about 75-99 wt. percent of an acrylated urethane and about 1-24 wt. percent of the super hydrophobic material form a suitable formulation for application to miniature and sub-miniature fasteners. In an embodiment, additional additives such as pigments, for example a black pigment, flow modifiers and anti-counterfeiting agents may be added in relatively small amounts to the formulation. A curing agent, such as an appropriate photoinitiator for curing the material by, for example exposing the material applied to the fastener to UV or LED light, is present in the material. Flow modifiers may or may not be needed if the viscosity of the sealing material is such that it flows properly and as desired, dependent upon the fastener size, material coating thickness and wicking characteristics desired and the like. Heat resistant additives may also be incorporated into the formulation to prevent additional chemical and/or physical changes to the material after curing. It will be appreciated that any additives used should not be of the type to interfere with the UV or LED curing step.

Advantageously, it has been found that such a formulation provides a low viscosity liquid material that better lends itself to high speed application with fewer rejects. Such a material permits high speed application onto small screws due to the low viscosity, e.g., about 500-2000 centipoise, which makes it only slightly more viscous than water.

Moreover, such materials can be cured in a relatively short period of time without the use of heat. Indeed, the material can be cured using an ultraviolet light source (at the proper wavelength of ultraviolet light) or an LED light source, as appropriate, and based upon the type of photo initiator used. It has been found that the materials can be cured, on miniature and sub-miniature fasteners in about 2-20 seconds, and preferably in about 2-10 seconds and preferably still in about 2-5 seconds without the use of heat. Unlike known sealing materials which require application to heated fasteners or heating after application to the fasteners, the present material cures in about 2-20, or 2-10 or 2-5 seconds at a temperature of less than about 66 deg. C. (about 151 deg. F.), and preferably at about room temperature 25 deg. C. (about 77 deg. F.). Thus, curing can be carried out without the need for induction or other types of heating.

It has been observed that fasteners that have sealing materials such as nylon applied using heating methods that may require temperatures as high as 375 deg. F. to 450+ deg. F. in order to melt the nylon, may exhibit blistering of the decorative finishes on the screws.

Moreover, unlike known sealing materials that are applied as powders, the present sealing material is applied as a liquid. As such, and because of the low viscosity, when the material is applied to a fastener, for example, the underside of the head of a fastener (e.g., the bearing surface), the material can be formulated to readily flow around the entirety of the underside of the head, thus providing a completely wetted surface, ready for curing. It will be appreciated that the material can be formulated with, for example, flow additives such that it is slightly more resistant to flow and does not wick up to the bearing surface. Such a formulation may be advantageous in applications such as when the fastener threads extend fully up to the underside of the head or the bearing surface. Furthermore, the material includes no solvents, no halogens, no polyvinyl chlorides (PVCs), no REACH substances of very high concern (REACH SVHCs), no phthalates, no bisphenol A (BPA) and is RoHS (restriction of hazardous substances) compliant.

It has been found that miniature and subminiature fasteners having the present sealing material exhibit superior performance in sealing against water and that the cured material has outstanding adhesion to metals. It has also been found that fasteners having the present sealing material exhibit excellent adhesion to steel and superior durability for multiple installations; that is the fasteners can be installed and removed multiple times and the material remains in place, with a high degree of integrity, such that the sealing properties of the material-applied fasteners are retained. It was also observed that the present sealing material exhibited good water resistance and high temperature, e.g., heat resistance, up to about 300 deg. F. (about 150 deg. C.).

Adhesion performance of the sealant to the fastener can be further enhanced so that the fastener and sealant retain their characteristics following multiple installations. It has been found that enhanced performance after initial testing was exhibited when the fasteners were subjected to a plasma treatment process prior to application of the sealant to the fasteners. These plasma pre-treated fasteners exhibited a significant reduction in sealant failures after multiple installations and removals. Adhesion performance can also be enhanced using internal (chemical solutions) additives and treatments. Suitable treatments include treatments with adhesion promoters.

Figure 5:
FIG. 5 is a photograph of a submergence test structure.
Figure 6A:
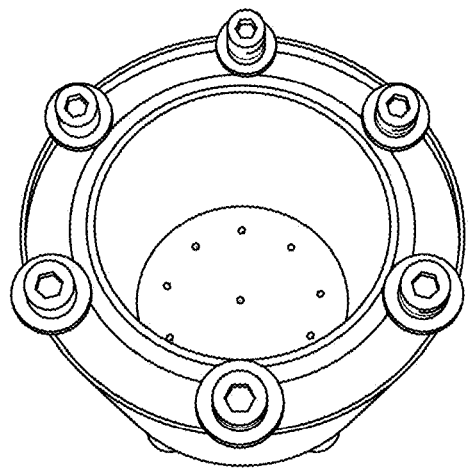
FIGS. 6A and 6B are photographs of a test chamber.
Figure 6B:
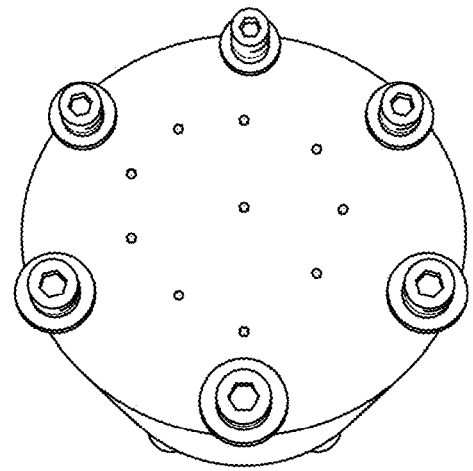

Tests were conducted using the present sealing material on M1.0 fasteners to determine the effectiveness of the present sealing material. A testing device was constructed that included a submergence test structure or tank (FIG. 5) and a submergence test chamber (FIGS. 6A and 6B) in which 10 M1.0 fasteners having the sealing material applied thereto secured a transparent plastic plate to a steel chamber. In each of the tests, the sealed chamber was submerged in a column of water to a depth of 1 meter for a period of time in minutes. Four types of tests were conducted.

In the first test, the fasteners were installed and the chamber submerged for a period of 30 minutes. After the chamber was submersed for 30 minutes, the chamber was removed from the tank and examined from the bottom, through the plastic cover, to confirm that it was free of leaks. After the submergence test, the chamber was placed in an oven at about 195 deg. F. (90 deg. C.) for 10 minutes until the surface reached about 122 deg. F. (50 deg. C.). The chamber was then removed from the oven and a small amount of water was dripped on to the plastic cover. After 45 seconds, the water was wiped off of the plastic cover to confirm that the chamber was free of any signs of water vapor or droplets.

In the second test, the fasteners were installed and removed four times to show durability over multiple installations and were subsequently submergence tested. Following the final installation, the chamber was submersed to a depth of about 1 meter depth for a period of 30 minutes. Following submergence, the chamber was removed from the tank and examined from the bottom, through the plastic cover, to confirm that it was free of leaks. Subsequently, the chamber was placed into an oven at about 195 deg. F. (90 deg. C.) for 10 minutes until the test fixture reached about 122 deg. F. (50 deg. C.). The testing device was then removed from the oven and a small amount of water was dripped on to the plastic cover. After 45 seconds, the water was wiped off of the plastic cover to confirm that the chamber was free of any signs of water vapor or droplets.

In the third test, the fasteners were tightened onto the plate and the chamber was conditioned, e.g., placed in a mechanical oven, at a temperature of about 175 deg. F. (80 deg. C.) for a period of 24 hours. After conditioning, the chamber was allowed to return to room temperature before the submergence test was conducted. The chamber was then submersed to a depth of about 1 meter for about 30 minutes. After submergence, the chamber was removed from the tank and examined from the bottom, through the plastic cover, to confirm that it was free of leaks. Subsequently, the chamber was placed into an oven at about 195 deg. F. (90 deg. C.) for a period of 10 minutes until the surface reached about 122 deg. F. (50 deg. C.). The chamber was then removed from the oven and a small amount of water was dripped on to the plastic over. After 45 seconds, the water was wiped off of the plastic cover to confirm that the chamber was free of any signs of water vapor or droplets.

In another test, the fasteners were tightened onto the plate and the chamber was conditioned, e.g., placed in a mechanical oven, at a temperature of about 250 deg. F. (120 deg. C.) for a period of 3 hours. After conditioning, the chamber was allowed to return to room temperature before the submergence test was conducted. The chamber was then submersed to a depth of about 1 meter for about 30 minutes. After submergence, the chamber was removed from the tank and examined from the bottom, through the plastic cover, to confirm that it was free of leaks. Subsequently, the chamber was placed into an oven at about 195 deg. F. (90 deg. C.) for a period of 10 minutes until the surface reached about 122 deg. F. (50 deg. C.). The chamber was then removed from the oven and a small amount of water was dripped on to the plastic cover. After 45 seconds, the water was wiped off of the plastic cover to confirm that the chamber was free of any signs of water vapor or droplets.

In still another test of the fasteners in which the fasteners were plasma pretreated and the material from Advanced Adhesive Systems, Inc. was used, following application and curing of the material, the fasteners were installed and removed three times at room temperature. The fasteners and plates were then tested at 8 psi and 16 psi for 60 seconds and inspected for leakage. No leakage was observed. The samples were then heated in an oven at 120 deg. C. for 3 hours and then retested at 8 psi and 16 psi for 60 seconds and inspected for leakage. No leakage was observed. Adhesion of the sealant material to the fasteners was also checked, and the material could not be removed from the fasteners' bearing surfaces. A similar test was conducted in which the same protocol was followed except that the fasteners were heated in an oven at 80 deg. C. for a period of 12 hours rather than 3 hours at 120 deg. C.

The results of each test showed that no condensation or leakage was observed and as such, it was determined that there was no moisture inside the chamber and no water infiltration into the chamber.

It is also contemplated that sealing materials can be formulated for use on larger fasteners. For example a formulation for larger fasteners may use as a principal material, an acrylate or acrylated urethane, such as that available from Dymax Corporation under product names DUAL-CURE 9481-E and 9482, or the above-referenced material by Advanced Adhesive Systems. It has been found that these acrylated urethanes have high water, chemical and heat resistance while retaining the advantageous characteristics of superior performance in sealing against water and exhibited outstanding adhesion to metals. In addition, use of these materials provides a sealing material that exhibits excellent adhesion to steel and superior durability for multiple installations with a high degree of integrity such that the sealing properties of the material-applied fasteners are retained.

Figure 7A:
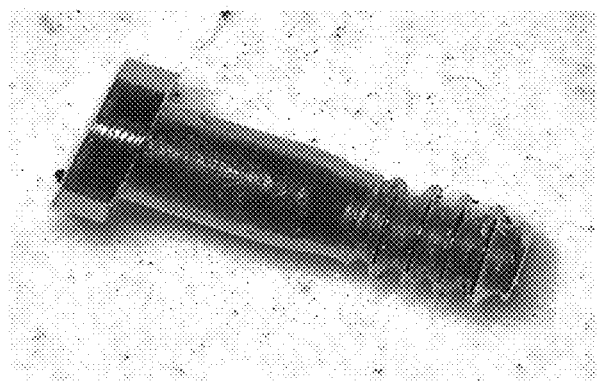
Figure 7B:
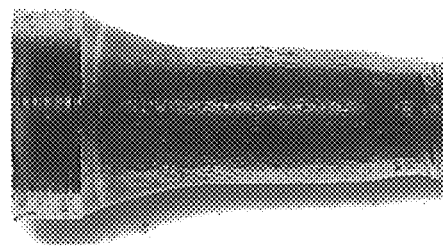

As noted above, one advantageous characteristic of an embodiment of the present sealing material is its ability to wick up onto a portion of the fastener shank. FIGS. 7A and 7B are photographs showing the ability of an embodiment of the material to wick up onto the shank of a fastener in which FIG. 7A illustrates a fastener prior to application of the present sealing material and FIG. 7B illustrates a fastener in which the embodiment of the sealing material is applied to the fastener and shows the material wicking onto a portion of the shank of the fastener to form a cone-like shape between the shank or threads near the head of the fastener and the fastener head. Such wicking may be desired or required in certain applications.

In another aspect, a sealing material includes as a principal material, an acrylate, such as acrylated materials, for example, acrylated polyesters, aliphatic and aromatic acrylated urethanes and the like, such as an acrylated urethane, for example, a urethane acrylated resin, which is commercially available from Advanced Adhesive Systems, Inc. of Newington, Conn., under product No. AAS 82059B.

An additive, such as a nanostructured chemical, such as a polyhedral oligomeric silsesquioxane (POSS) can be added to the urethane material to enhance the physical properties of the sealant. One such POSS material is the commercially available from Hybrid Plastics Inc. of Hattiesburg, Miss., under the product grade MA0735.

In an embodiment it was found that a formulation of about 90 to 97 wt. percent of an acrylated urethane and about 3 to 10 wt. percent of a nanostructured additive form a suitable formulation for application to fasteners. In embodiments, the urethane can be present at about 95 wt. percent and the nanostructured additive can be present at about 5 wt. percent of the sealant. In an embodiment, additional additives such as pigments, for example a black pigment, flow modifiers and anti-counterfeiting agents may be added in relatively small amounts to the formulation. A curing agent, such as an appropriate photoinitiator for curing the material by, for example exposing the material applied to the fastener to UV or LED light, is present in the material. Flow modifiers may or may not be needed if the viscosity of the sealing material is such that it flows properly and as desired, dependent upon the fastener size, material coating thickness and wicking characteristics desired and the like. It will be appreciated that any additives used should not be of the type to interfere with the UV or LED curing step.

As in the previously disclosed formulation, it has been advantageously found that such a formulation provides a low viscosity liquid material that better lends itself to high speed application with fewer rejects. Such a material permits high speed application onto fasteners due to the low viscosity, e.g., about 500 to about 2000 centipoise (cP), and about 1300 cP, which makes it only slightly more viscous than water.

And, such materials can be cured in a relatively short period of time without the use of heat. Indeed, the material can be cured using an ultraviolet light source (at the proper wavelength of ultraviolet light) or an LED light source, as appropriate, and based upon the type of photo initiator used. It has been found that the materials can be cured, on fasteners in about 2-20 seconds, and preferably in about 2-10 seconds and preferably still in about 2-5 seconds without the use of heat. Unlike known sealing materials which require application to heated fasteners or heating after application to the fasteners, the present material cures in about 2-20, or 2-10 or 2-5 seconds at a temperature of less than about 66 deg. C. (about 151 deg. F.), and preferably at about room temperature 25 deg. C. (about 77 deg. F.). Thus, curing can be carried out without the need for induction or other types of heating.

Referring to FIGS. 10A and 10B, the present liquid-applied sealing material, because of its low viscosity, when applied to a fastener, for example, the underside of the head of a fastener (e.g., the bearing surface), can be formulated to readily flow around the entirety of the underside of the head, and to wick along a portion of the thread or shank adjacent to the head forming a cone-like shape, thus providing a completely wetted surface, ready for curing. It will be appreciated that the material can be formulated with, for example, flow additives such that it is slightly more resistant to flow and does not wick up to the bearing surface. FIG. 10A shows the fastener prior to application of the sealant and FIG. 10 B shows the fastener with the sealant applied and wicking along the upper-most threads to form the cone-like shape. Such a formulation may be advantageous in applications such as when the fastener threads extend fully up to the underside of the head or the bearing surface. A fastener having the sealant applied to it and following installation and removal 5 times, is shown in FIG. 15. It can be seen that no cracking or delamination of the sealant has occurred.

Furthermore, the material includes no solvents, no halogens, no polyvinyl chlorides (PVCs), no REACH substances of very high concern (REACH SVHCs), no phthalates, no bisphenol A (BPA) and is RoHS (restriction of hazardous substances) compliant. In addition, the sealant is free of sulfur-containing compounds, plasticizers and out-gassing materials.

It has been found that fasteners having the present sealing material exhibit superior performance in sealing against water and that the cured material has outstanding adhesion to metals. It has also been found that fasteners having the present sealing material exhibit excellent adhesion to steel and superior durability for multiple installations; that is the fasteners can be installed and removed multiple times and the material remains in place, with a high degree of integrity, such that the sealing properties of the material-applied fasteners are retained. It was also observed that the present sealing material exhibited good water resistance and high temperature, e.g., heat resistance, up to at least about 85 deg. C. (185 deg. F.).

Tests were conducted to determine the effectiveness of a sealant having a nanostructured chemical, such as a polyhedral oligomeric silsesquioxane (POSS) additive. The sealant was formulated with about 95 wt. percent of an acrylated urethane and about 5 wt. percent of a nanostructured additive.

In a first set of tests, referring to FIGS. 16 and 17, two sets of thirty (30) samples were tested. The first set of samples had a polyurethane coating only (a base or control) and the second set of samples had a polyurethane (at 95 wt. %) and nanostructured chemical (PU/POSS) (at 5 wt. %) sealant applied thereto. At 185 deg. F. (85 deg. C.) all of the samples passed the seal test and none of the samples exhibited cracking.

At 203 deg. F. (95 deg. C.) 25 of the control samples passed the seal test (5 failed) and all of the PU/POSS samples passed the seal test; 9 of the control samples exhibited cracking and none of the PU/POSS samples exhibited cracking. At 221 deg. F. (105 deg. C.) 16 of the control samples passed the seal test (14 failed) and 20 of the PU/POSS samples passed the seal test (10 failed); 16 of the control samples exhibited cracking and 8 of the PU/POSS samples exhibited cracking.

Fasteners with the control sealant and the PU/POSS sealant were also tested for delamination following exposure to 185 deg. F. (85 deg. C.) for a period of 30 minutes and bearing against a surface as by threading the fastener into a mating opening. Twenty of each the control and the PU/POSS sealant applied fasteners were tested. Of the 20 control fasteners tested, 13 showed partial removal or delamination at the bearing surface, whereas none of the PU/POSS coated fasteners showed partial removal or delamination.

FIG. 11 illustrates an automobile taillight assembly and the fasteners F1-F3 that are used to secure the parts of the two-part assembly in a sealed condition. It is contemplated that the present sealant will be used on the fasteners for sealing the assembly. Fasteners with the sealant were tested in an environment to simulate fastening the taillight assembly portions (to fasten the two portions of the taillight assembly to one another in a two-article system). The simulated environment was established using the pressure/vacuum testing equipment illustrated in FIGS. 12A-12D. The fasteners were coated with the sealant described above and were cured using UV light for a period of 25 seconds. The UV light used had a relatively low intensity and it is contemplated that a UV light source of a higher intensity will be used in production.

In another set of tests similar to the submergence tests noted above, a testing device was constructed that included a submergence test structure or tank and a submergence test chamber (FIGS. 12A-12D) in which 5 M3.0 fasteners having the sealing material applied thereto secured a steel plate to a steel chamber (a two article system). The tested were conducted in accordance General Motors Worldwide procedure GMW14906 4.5.4.3, Pressurization Seal Test. In each of the tests, the sealed chamber was submerged in water in the submergence tank to a depth of 1 inch (2.5 cm). The interior of the chamber was pressurized to a pressure of 1 psig (7 kPa) for a period of 5 minutes. Fifty samples of fasteners with the POSS formulated sealant were tested and all passed with no leakage. The pressure was increased to 10 psig (68.9 kPa) and the samples all passed with no leakage. The 10 psig pressure was ten times the required pressure.

In the same testing device, fifty samples were tested under vacuum. The tests were conducted in accordance General Motors Worldwide procedure GMW14906 4.5.4.1, Vacuum Seal Test. A vacuum was drawn in the chamber with the chamber submerged in water for a period of 15 seconds. A vacuum of 3 psi (−21.0 kPa) was drawn in the chamber and all of the samples passed the vacuum test. The vacuum was increased to 5 psi (−33.9 kPa) and all of the sample passed at the increased vacuum as well.

Another set of tests under pressure and vacuum were conducted following thermal cycling of the samples. This is referred to as a storage test and was conducted in accordance General Motors Worldwide procedure GMW14906 4.9.2.12, Storage Test. Under this test regime, the samples were tested both before and after thermal cycling. The samples were first heated to a temperature of 176 deg. F. (80 deg. C.)+/−5.4 deg. F. (+/−3 deg. C.) for a period of 48 hours, and then returned to ambient temperature 73 deg. F. (23 deg. C.)+/−9 deg. F. (+/−5 deg. C.) for a period of greater than 15 minutes, and then cooled to a temperature of −40 deg. F. (−40 deg. C.)+/−5.4 deg. F. (+/−3 deg. C.) for a period of 24 hours. The samples were then allowed to return to ambient temperature 73 deg. F. (23 deg. C.)+/−9 deg. F. (+/−5 deg. C.) for a period of greater than 15 minutes and pressure and vacuum tested. All of the samples passed pressure and vacuum tests.

A subsequent test was conducted to test to failure under pressure in accordance General Motors Worldwide procedure GMW14906 4.0.2.8.8.3. In the same testing device, the pressure in the device was increased to 0.25 psig (1.75 kPa) for 1 minute after which the pressure in the device was increased by 0.25 psig (1.72 kPa) increments below 1.52 psig (10.5 kPa) and 0.5 psi (3.5 kPa) increments above 1.52 psig (10.5 kPa) and held for a period of 1 min. at each increment to reach failure. The pressure was increased to 10 psig (68.9 kPa) after which the test was terminated due to safety concerns. The 10 psig pressure was ten times the required pressure. None of the samples failed prior to test termination.

Figure 13:
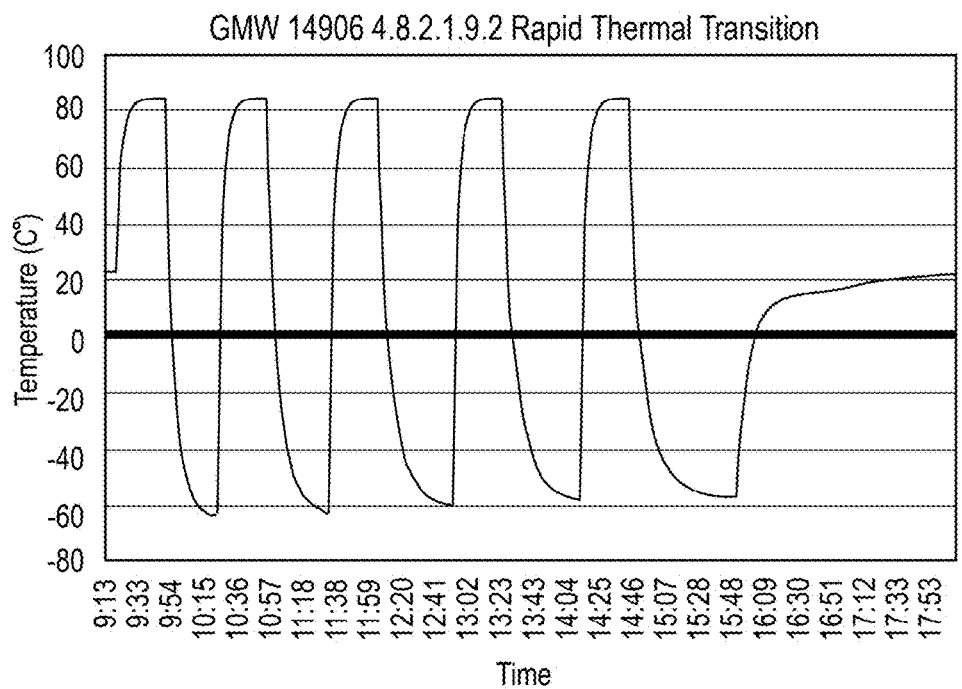
FIG. 13 is a graphical representation of one thermal cycling test, showing temperature (deg. C.) vs. time (hour:min)

Pressurization and vacuum tests were also conducted following rapid thermal transition in accordance with GMW 14906 4.8.2.1.9.2, Rapid Thermal Transition. The samples were thermally cycled between 185 deg. F. (85 deg. C.) and −76 deg. F. (−60 deg. C.), five times, in a period of about 6½ hours. A graphical representation of thermal cycling temperatures vs. time is shown in FIG. 13. The samples were then tested and all of the samples passed the pressure and vacuum tests.

In another set of tests, samples were submergence tested in accordance Fiat Chrysler Automobiles (FCA) procedure FCA PF.90078 5.2.1, Sealing Requirement Submergence Test. In these tests, a sealed chamber was submerged in water in the submergence tank and the interior of the chamber was pressurized to a pressure of 0.75 psig (5.2 kPa) for a period of 60 seconds at room temperature. All of the samples passed with no leakage.

Figure 14:
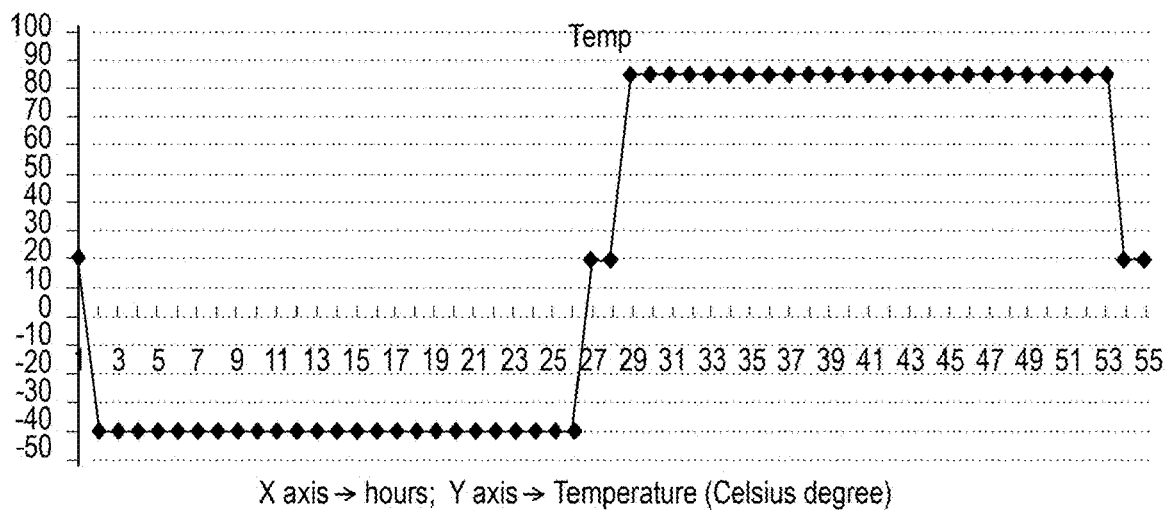
FIG. 14 is a graphical representation of another thermal cycling test, showing temperature (deg. C.) vs. time (hours)

Samples were then tested in accordance with FCA PF.90078 5.15, Shipping/Storage Temperature Tests, in which the samples were thermally cycled and subsequently tested in the above-noted Submergence Test. The samples were cooled to −40 deg. F. (−40 deg. C.) for a period of about 24 hours, brought to about room temperature 68 deg. F. (20 deg. C.) for a period of 2 hours, then heated to a temperature of 185 deg. F. (85 deg. C.) for a period of 24 hours and then returned to room temperature 68 deg. F. (20 deg. C.). Following cycling, the samples were subject to the Submergence Test. A graphical representation of the thermal cycling temperatures vs. time is shown in FIG. 14. All of the samples passed with no leakage.

Samples were then tested in accordance with FCA PF.90078 5.22, Sealant Pressure Test to Fail, in which the chamber was initially pressurized to a pressure of 0.75 psig (5.2 kPa) with the pressure increased incrementally by 0.25 psig (1.72 kPa) and held for a period of 15 seconds until failure. The test was terminated at 10 psig (68.9 kPa) with no samples failing. The 10 psig pressure was ten times the required pressure.

Other benefits of the present POSS formulated acrylated urethane sealant were identified. For example, the sealant is harder than known sealant materials, having a hardness of about 55-60 Shore D, compared to known sealants that have a hardness of about 30-70 Shore A. For reference purposes, a 55-60 Shore D hardness is about equivalent to a 100 Shore A hardness. Enhanced hardness provides better toughness and tear resistance.

Additionally, the sealant exhibited no signs of cracking or delamination following the above noted GMW and FCA testing. In addition, fasteners with the sealant were exposed to a variety of chemicals commonly found in vehicles and the automotive industry, including, 50 percent methanol in water, antifreeze and coolants, wheel cleaners, automatic transmission fluid, car shampoo, automobile glass cleaners, paintwork cleaning products, oil cleaner, bug and tar remover, diesel fuel, ice spray wax and motor oil. The fasteners with the sealant were subject to these chemicals for a period of 24 hours, after which they were visual inspected and exhibited no signs of degradation, delamination or cracking.

As noted above, the sealant, as applied to fasteners tends to wick along the shank or upper threads of the fastener and under the head of the fastener, forming a cone-like shape. As such when tightened against a mating part/surface, the seal occurs along a circumferential line, rather than across the entirety of the mating parts, which concentrates the force exerted by the mating threads. This is in contrast to flat resilient washers (e.g., that function as gaskets) which compress along the entirety of the parts, resulting in greater force or softer material needed to compress the material and form the seal.

Other benefits of the present POSS formulated sealant include repeated (five times) installation and removal with no degradation or damage to, or delamination of the seal material or the seal formed. The fasteners do not require retightening after the items on which they are installed are annealed. For example, some taillight assemblies require annealing (at about 80 deg. F. or 27 deg. C.) to reduce stresses in the plastic after assembly. Known sealants, including polymer (EPDM) washers tend to loosen after tightening and annealing, whereas the present POSS formulated sealant does not loosen after tightening and annealing. The present sealant also exhibited limited to no compression set following installation.

Figure 18:
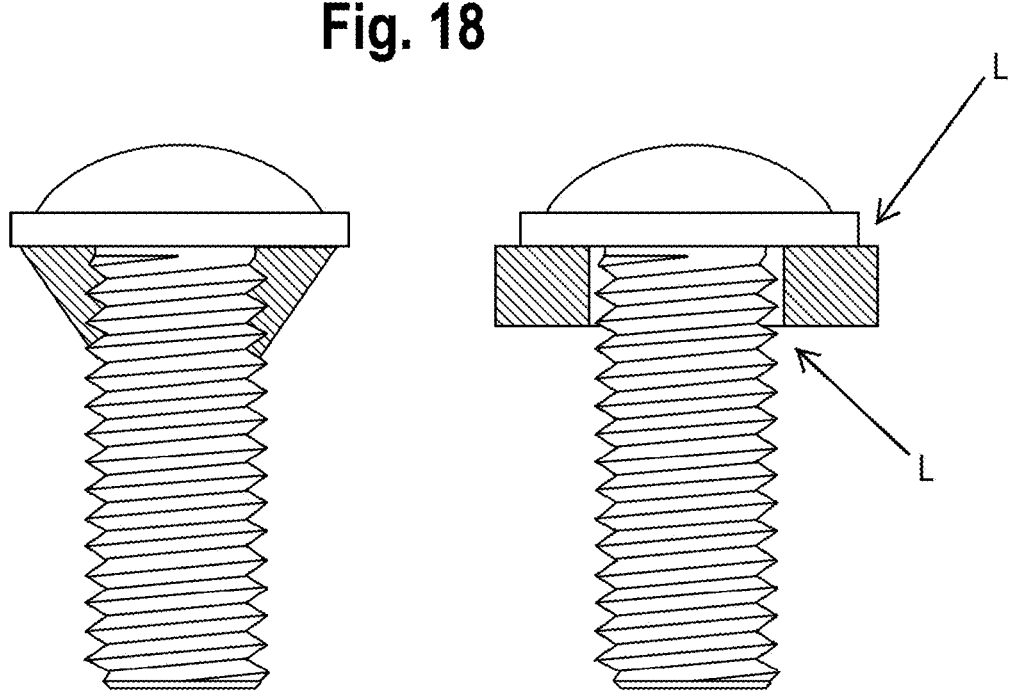
FIG. 18 is an illustration of a fastener with the present sealant and a fastener with a known washer-type seal.

The present material is not prone to tearing and provides a better sealing geometry (e.g., sealing against a cone, rather than against the flat of a cylinder). There is also a shorter leak path (see, for example, FIG. 18) compared to flat washers in that the present sealant adheres to the fastener and wicks onto the shank and threads near the underside of the fastener head, whereas the flat washer is loosely fitted on to the fastener and as such has leak paths as indicated at L.

Use of the present material does not result in outgassing as no peroxide or sulfur-containing materials are used. In addition, no phthalates or other chemicals are present that could otherwise leach from sealant. As such, the present sealant will not cause crazing or cracking of plastics to which it is tightened. And, the present material is applied as a solution and as such is easy to handle and use.

Figure 8:
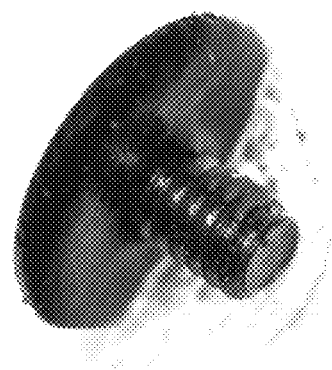
FIG. 8 is a photograph of a fastener with an original sealant material and blue patch (locking mechanism/material)
Figure 9A:
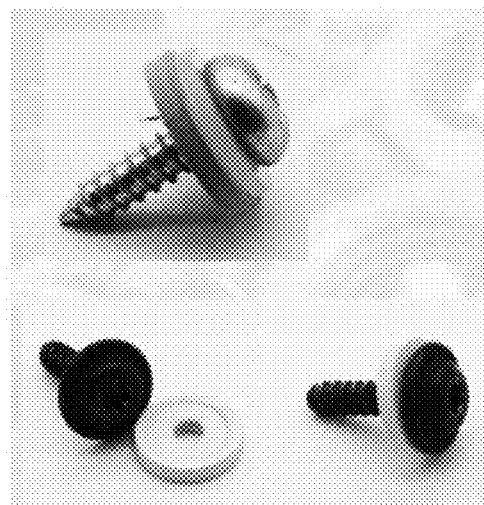
Figure 9B:
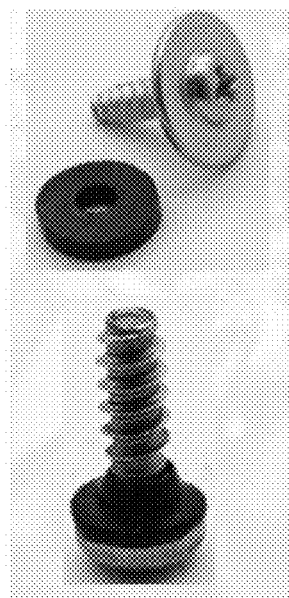
Figure 9C:
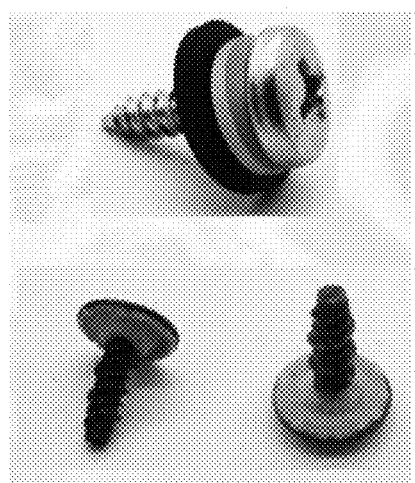
Figure 12A:
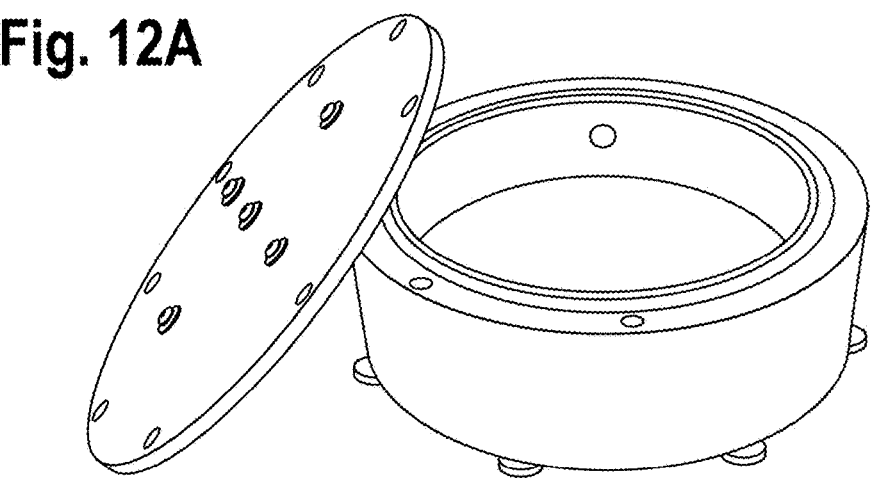
FIGS. 12A-12D illustrate the pressure/vacuum testing equipment.
Figure 12B:
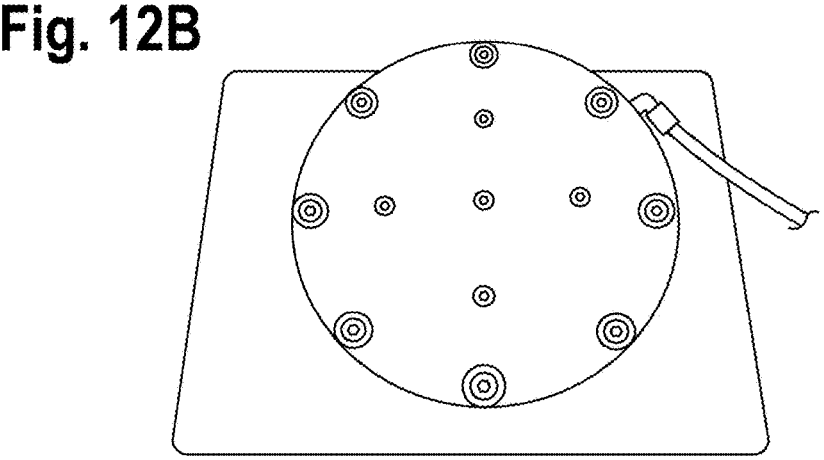
Figure 12C:
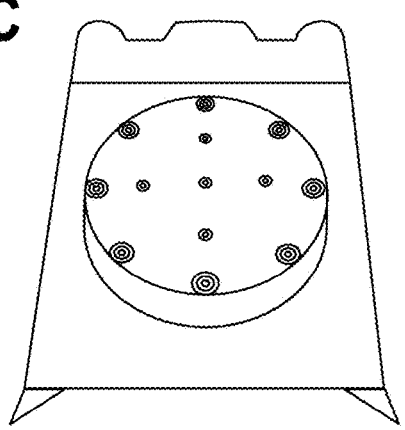
Figure 12D:
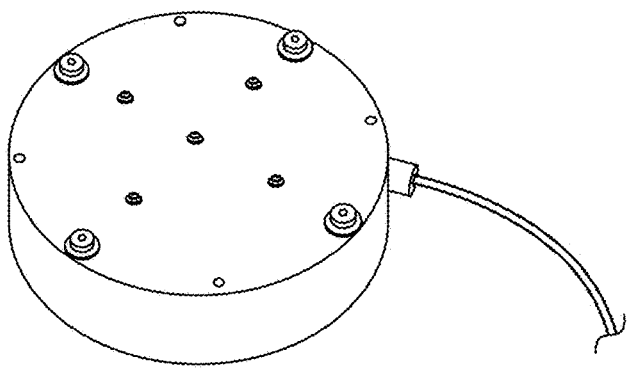

Moreover, due to its great adhesion to steel fasteners and its comparable hardness compared to nylon 11 (which is currently used as a mechanical locking mechanism/material for fasteners, see, for example, FIG. 8), the present sealing material serves multiple functions. As such, in addition to its use as a sealing material, it can also function to lock a fastener in place, without the need for secondary processing to, for example, apply a locking patch (e.g., a nylon 11 patch), thereby resulting in additional productivity improvements and reducing the complexity and steps required in manufacturing. In such an application, the sealant may be applied to the threads to serve as a thread locking material, with or without use as an under-head sealant.

A method of making a fastener with a sealing material thereon includes the steps of applying a liquid applied acrylate material to the fastener and curing the liquid applied acrylate material using an ultraviolet or LED light source and without the use of heat. The method can include pretreating the fastener with a plasma treatment. The liquid applied acrylate material can be any of the above-described materials, including a suitable photoinitiator, a nanostructured material, such as a polyhedral oligomeric silsesquioxane (FOSS), other additives such as a pigment present in an amount so as to not impede curing the material, a flow modifier and a heat resistive additive material. A super hydrophobic material may also be included as an additive.

In the present disclosure, the words "a" or "an" are to be taken to include both the singular and the plural. Conversely, any reference to plural items shall, where appropriate, include the singular. All percentages are percentages by weight, unless otherwise noted.

All patents and published applications referred to herein are incorporated by reference in their entirety, whether or not specifically done so within the text of this disclosure.

It will also be appreciated by those skilled in the art that the relative directional terms such as sides, upper, lower, top, bottom, rearward, forward and the like are for explanatory purposes only and are not intended to limit the scope of the disclosure.

From the foregoing it will be observed that numerous modifications and variations can be effectuated without departing from the true spirit and scope of the novel concepts of the present disclosure. It is to be understood that no limitation with respect to the specific embodiments illustrated is intended or should be inferred. The disclosure is intended to cover by the appended claims all such modifications as fall within the scope of the claims.

What is claimed is:

1. A two-article system in which first and second articles of the two-article system are joined to one another by a fastener having a sealing material on an underside of a head of the fastener and the shank or threads adjacent an underside of the head, the sealing material forming a cone-like shape at a transition from the shank or threads to the underside of the head, the sealing material formulated from an acrylate present in a concentration of about 90 to about 97 percent by weight of the sealing material and a nanostructured material present in a concentration of about 3 to about 10 percent by weight of the sealing material, the sealing material cured using UV or LED light prior to joining the articles to one another, wherein a fastener joining a two-article system, is capable of, when tested in accordance with General Motors Worldwide procedure GMW14906 4.5.4.3, Pressurization Seal Test exhibiting no failure, and with a test pressure increased to 10 psig, exhibiting no failure.

2. The two-article system of claim 1, wherein the acrylate is present in a concentration of about 95 percent by weight of the sealing material and the nanostructured material present in a concentration of about 5 percent by weight of the sealing material.

3. The two-article system of claim 1, wherein the sealant, when cured, has a hardness of about 55-60 Shore D.

4. The two-article system of claim 1, further including a group of fasteners, wherein each fastener of the group of fasteners, joining a two-article system, is capable of, when tested in accordance with General Motors Worldwide procedure GMW14906 4.5.4.3, Pressurization Seal Test exhibiting zero failures, and with a test pressure increased to 10 psig, exhibiting zero failures.

5. The two-article system of claim 1, wherein the acrylate is a urethane acrylate.

6. The two-article system of claim 1, wherein the acrylate is one or a combination of acrylated urethanes and acrylated polyesters.

7. The two-article system of claim 1, wherein the nanostructured material is a polyhedral oligomeric silsesquioxane (POSS).

8. The two-article system of claim 7 wherein the POSS is present in a concentration of about 5 percent by weight of the sealing material.

9. A two-article system in which first and second articles of the two-article system are joined to one another by a fastener having a sealing material on an underside of a head of the fastener and the shank or threads adjacent an underside of the head, the sealing material forming a cone-like shape at a transition from the shank or threads to the underside of the head, the sealing material formulated from an acrylate present in a concentration of about 90 to about 97 percent by weight of the sealing material and a nanostructured material present in a concentration of about 3 to about 10 percent by weight of the sealing material, the sealing material cured using UV or LED light prior to joining the articles to one another, wherein a fastener joining a two-article system, is capable of, when tested in accordance with General Motors Worldwide procedure GMW14906 4.5.4.1, Vacuum Seal Test exhibiting no failure, and with a vacuum increased to 5 psi, exhibiting no failure.

10. The two-article system of claim 9, wherein the acrylate is present in a concentration of about 95 percent by weight of the sealing material and the nanostructured material present in a concentration of about 5 percent by weight of the sealing material.

11. The two-article system of claim 9, wherein the sealing material is applied to the threads adjacent the underside of the head, the sealing material providing a thread lock.

12. The two-article system of claim 9, further including a group of fasteners, wherein each fastener of the group of fasteners, joining a two-article system, is capable of, when tested in accordance with General Motors Worldwide procedure GMW14906 4.5.4.1, Vacuum Seal Test exhibiting zero failures, and with a vacuum increased to 5 psi, exhibiting zero failures.

13. The two-article system of claim 9, wherein the acrylate is a urethane acrylate.

14. The two-article system of claim 9, wherein the acrylate is one or a combination of acrylated urethanes and acrylated polyesters.

15. The two-article system of claim 9, wherein the nanostructured material is a polyhedral oigomeric silsesquioxane (POSS).

16. The two-article system of claim 15 wherein the POSS is present in a concentration of about 5 percent by weight of the sealing material.

* * * * *